US011994279B1

(12) United States Patent
Antetomoso

(10) Patent No.: US 11,994,279 B1
(45) Date of Patent: May 28, 2024

(54) CONNECTOR LOADING DEVICE

(71) Applicant: Maxar Space LLC, Westminster, CO (US)

(72) Inventor: Raymond Antetomoso, Pacifica, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 18/054,747

(22) Filed: Nov. 11, 2022

(51) Int. Cl.
*F21V 23/06* (2006.01)
*F21V 23/00* (2015.01)
*F21Y 115/10* (2016.01)

(52) U.S. Cl.
CPC ............ *F21V 23/06* (2013.01); *F21V 23/005* (2013.01); *F21Y 2115/10* (2016.08)

(58) Field of Classification Search
CPC ..... F21V 23/06; F21V 23/005; F21Y 2115/10
See application file for complete search history.

(56) References Cited

U.S. PATENT DOCUMENTS 6,257,906 B1 * 7/2001 Price ...................... H01R 13/60 439/910
7,654,858 B2 * 2/2010 Geiger ................. H01R 13/641 439/490
7,670,170 B2 * 3/2010 Henry ................ H01R 13/7172 439/490
9,160,118 B2 * 10/2015 Tuchrelo ............ H01R 13/7175
9,660,395 B2 * 5/2017 Yeom ...................... H01R 13/74
2005/0032415 A1 * 2/2005 Sakamoto .......... H01R 13/6641 439/490
2011/0115494 A1 * 5/2011 Taylor .................... H04Q 1/144 439/490

* cited by examiner

*Primary Examiner* — Peggy A Neils
(74) *Attorney, Agent, or Firm* — Vierra Magen Marcus LLP

(57) ABSTRACT

A connector loading device may comprise a receptacle, a plurality of light sources, and a controller. The receptacle may comprise a first plurality of holes. The first plurality of holes are configured to respectively line up with a second plurality of holes in a connector when the connector is inserted in the receptacle. Each one of the first plurality of holes comprises a respective and corresponding one of a plurality of unique indexes. The plurality of light sources respectively correspond to the first plurality of holes. Each one of the plurality of light sources, when initiated, is configured to illuminate light from a bottom of its respective one of the first plurality of holes through a top of its respective one of the first plurality of holes. The controller is configured to receive an input and initiate a one of the plurality of light sources corresponding to the index.

20 Claims, 6 Drawing Sheets

CONNECTOR LOADING DEVICE

TECHNICAL FIELD

The present disclosure relates generally to loading a connector.

BACKGROUND

Electronic connectors are devices that join electronic circuits. They are used in assembling, installing, and supplying power to electrical devices. Connectors are an important component of electronic equipment used in industrial machinery, consumer electronics, communications, and home and commercial appliances. These devices make electronic products functional and complete. Most connectors are temporary or removable while some are used as permanent electrical joints.

The two main components of an electrical connector are its contacts and housing, also referred to as its plug or receptacle. The housing holds the terminals and ensures the stability of their connections. It isolates the terminals from other electronic components and prevents short-circuiting. Plugs and receptacles protect the terminals from the elements and weather and may be made from insulating materials such as molded plastics or ceramics.

Additional parts may be added to a connector depending on how it may be used. Key connectors may only be inserted in a specific orientation. A lock may be placed on a connector to prevent it from being undone while sealed connectors may be used underwater.

Connector terminals are the pins that may provide a continuous path for the electrical current to flow between circuits. They are made from electrically conductive materials such as brass, phosphor bronze, beryllium copper, and high copper alloy.

Electronic connectors are usually found as pairs, and each half has a gender designation. The male component is called the plug, while the female component is called the jack or socket. The jack has recessed holes that contain the terminals and are connected to a wire, cable, or device. The terminals of the plug are inserted into the slots of the jack to enable their connection.

Most connectors may only be plugged in one orientation, as electric charges exhibit polarity. Keying is a feature of electronic connectors that avoids incorrect mating orientation. A keyway prevents mechanical and electrical damage to the pins from dangerous and incompatible connections. It also averts plugging the connector at the wrong angle or the wrong socket. A keyway helps deal with symmetrical connectors.

A locking mechanism holds the connector in place during mating. It prevents the connector from being displaced when bumped or jolted. It avoids accidental uncoupling of the connector during operation, which can induce damage to the electronic device. There are various types of locking mechanisms in electronic connectors, including push-pull connectors, bayonet couplings, and fine thread screw couplings.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1A:
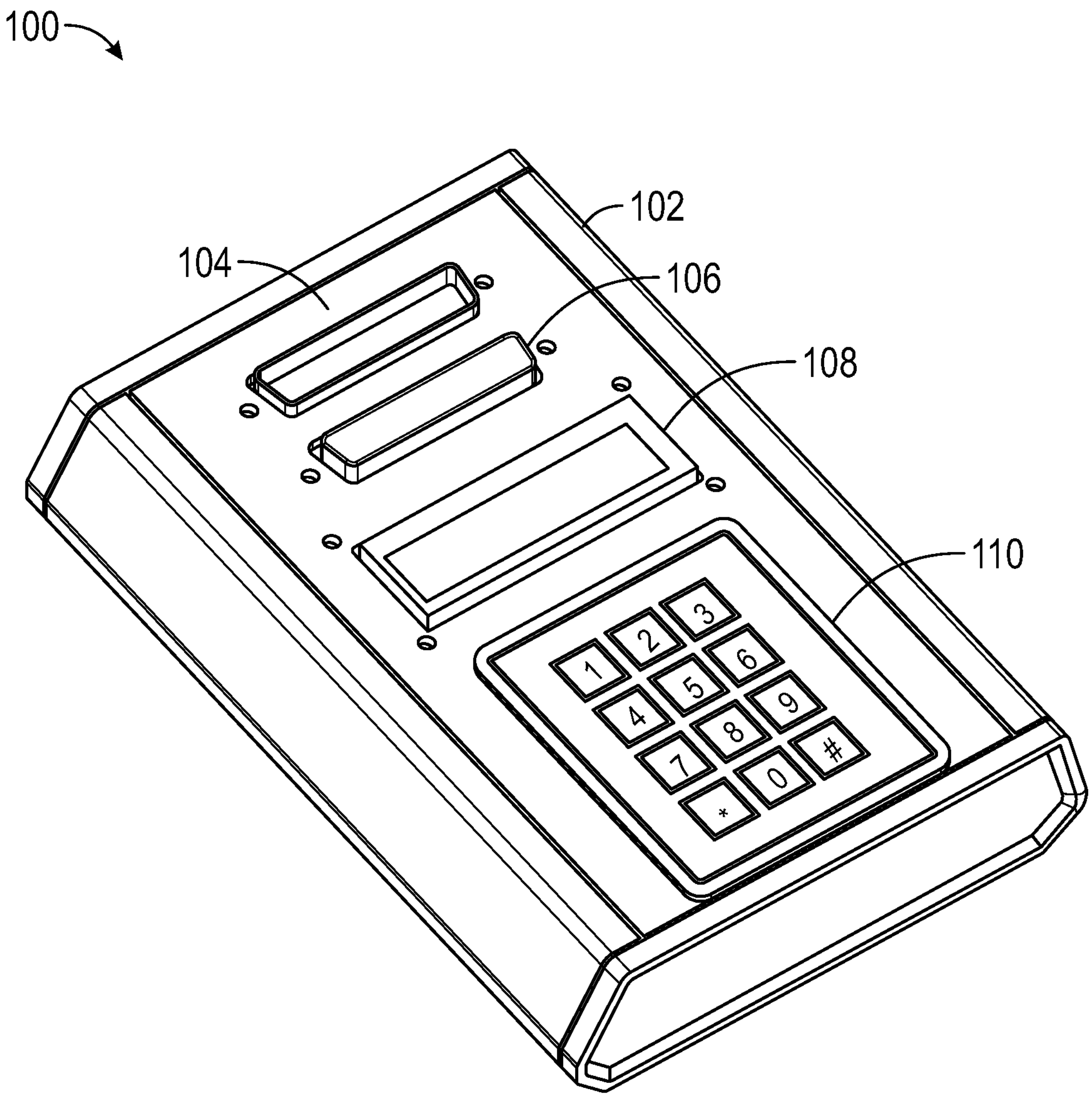
FIGS. 1A and 1B illustrate a connector loading device.

A connector loading device may comprise a receptacle, a plurality of light sources, and a controller. The receptacle may comprise a first plurality of holes. The first plurality of holes are configured to respectively line up with a second plurality of holes in a connector when the connector is inserted in the receptacle. Each one of the first plurality of holes comprises a respective and corresponding one of a plurality of unique indexes. The plurality of light sources respectively correspond to the first plurality of holes. Each one of the plurality of light sources, when initiated, is configured to illuminate light from a bottom of its respective one of the first plurality of holes through a top of its respective one of the first plurality of holes. The controller is configured to receive an input and initiate a one of the plurality of light sources corresponding to the index.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When connecting wires to a connector, conventional systems may include an operator having to count the location of where a wire is to be connected and have an image of the backside of the connector with the connector indexes in order to know where to connect the wire to the connector. Embodiments of the disclosure may provide a tool for the manufacturing of harnesses that may light up or illuminate a pin location for inserting a wire into a connector that may reduce the number of pin swaps due to errors in initial wire to connector connections.

Figure 1B:
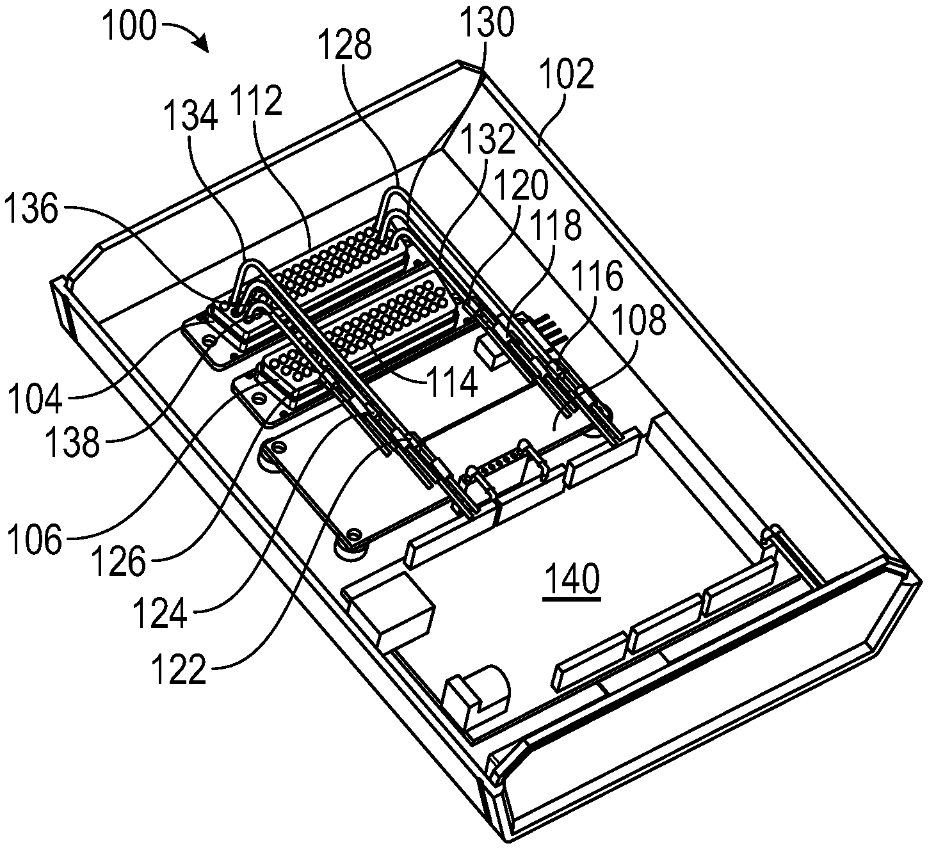

FIGS. 1A and 1B show a connector loading device 100. FIG. 1A shows a front side of connector loading device 100 and FIG. 1B shows a cutaway of a back side of connector loading device 100. As shown in FIGS. 1A and 1B, connector loading device 100 may comprise an enclosure 102, a first receptacle 104, a second receptacle 106, a display 108, and a keypad 110. For example, first receptacle 104 may be configured for a shell size 5 (e.g., 50 pin) male D-type connector and second receptacle 106 may be configured for a shell size 5 (e.g., 50 pin) female D-type connector. Accordingly, the example configuration shown in FIGS. 1A and 1B may be used to load shell size 5 male D-type connectors and shell size 5 female D-type connectors.

While FIGS. 1A and 1B show first receptacle 104 and second receptacle 106 as being configured for D-type connectors, embodiments of the disclosure are not limited to D-type connectors and may be configured for any type connectors including circular connector connectors. While connector loading device 100 is shown with two receptacle, embodiments of the disclosure may comprise any number of receptacles, comprising any type, comprising any size (e.g., number of pins), and having any gender.

Furthermore, while FIGS. 1A and 1B show connector loading device 100 as one piece, embodiments of the disclosure may include a modular configuration. For example, a first module may comprise the receptacle or receptacles (e.g., first receptacle 104 and second receptacle 106) and a second module may comprise display 108 and keypad 110. A cable (e.g., including optical fibers and/or electrical conductors) may connect the two modules. In this way, a plurality of first modules may be configured in any way with any number of receptacles, comprising any type, comprising any size (e.g., number of pins), and having any gender. Then the second module may be connected and used with any of the plurality of first modules.

As shown in FIG. 1B, first receptacle 104 may comprise a first plurality of holes 112. On the front side of connector loading device 100, a first connector may be inserted in first receptacle 104. The first connector may comprise a second plurality of holes. First plurality of holes 112 may be configured to line up with the second plurality of holes in the first connector when the first connector is inserted in first receptacle 104.

As shown in FIG. 1B, second receptacle 106 may comprise a third plurality of holes 114. On the front side of connector loading device 100, a second connector may be inserted in second receptacle 106. The second connector may comprise a fourth plurality of holes. Third plurality of holes 114 may be configured to line up with the fourth plurality of holes in the second connector when the second connector is inserted in second receptacle 106.

Figure 2A:
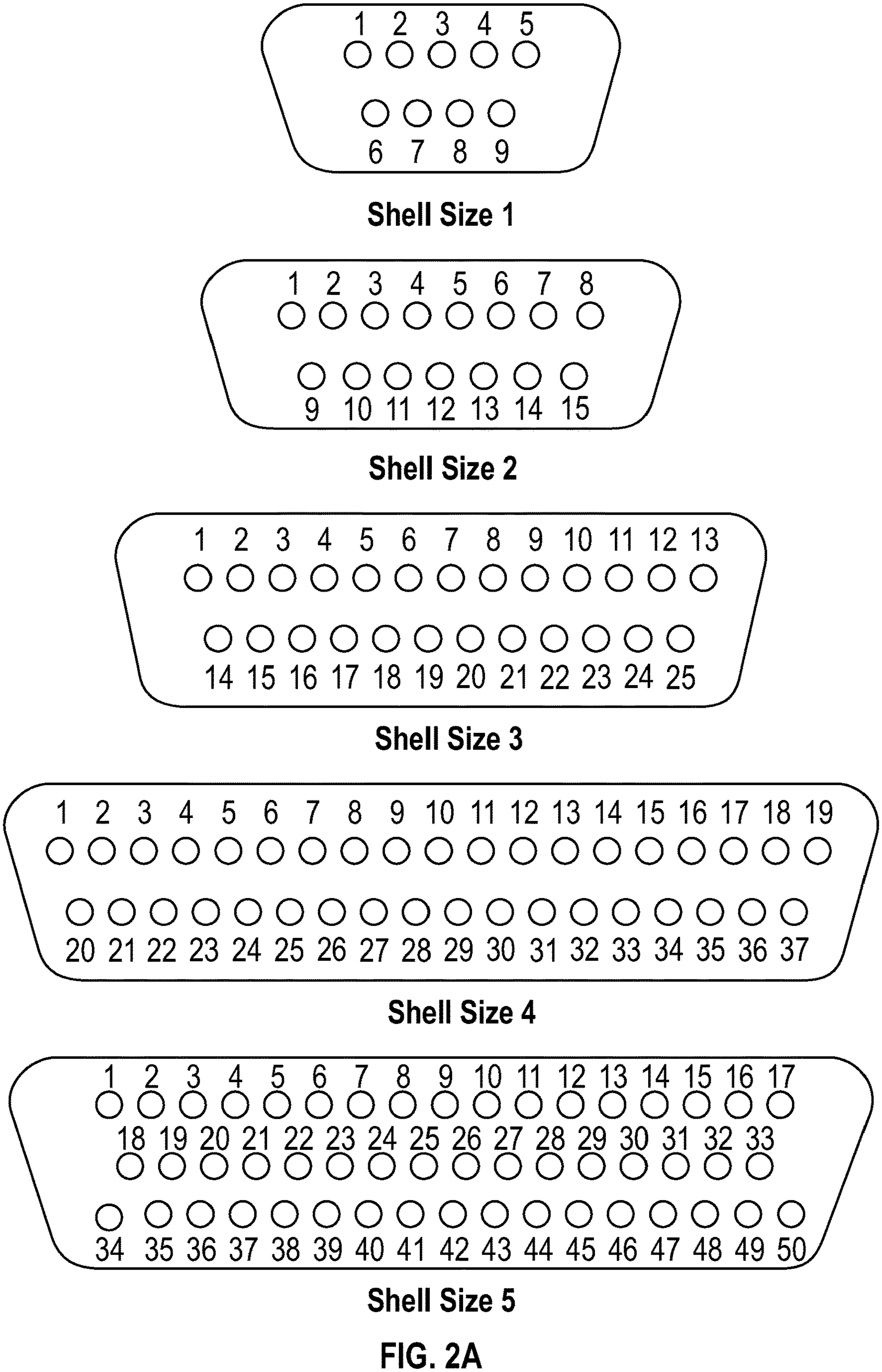
FIGS. 2A and 2B illustrate unique indexes for various connectors.
Figure 2B:
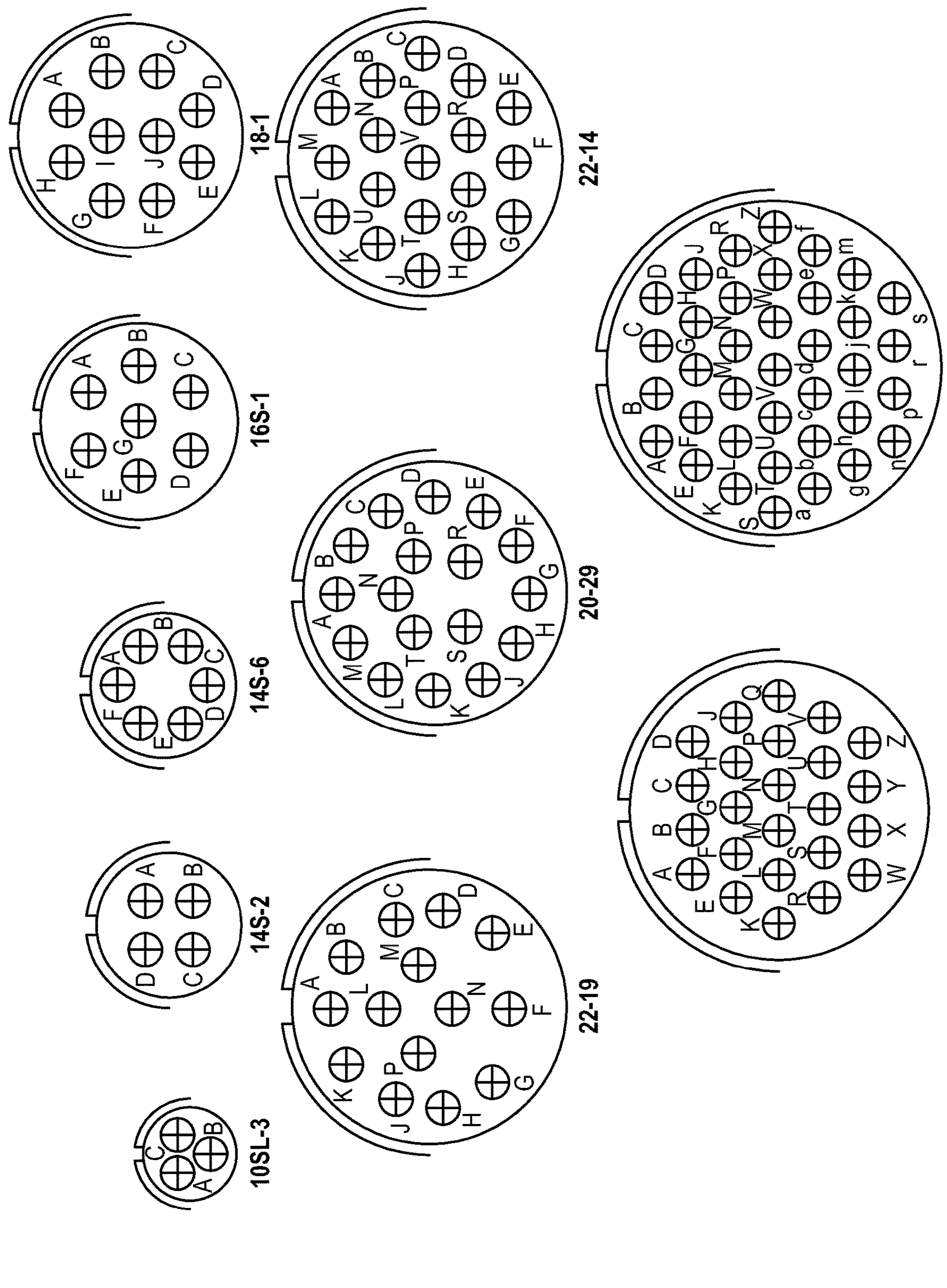

Each one of first plurality of holes 112 and each one of third plurality of holes 114 may comprise a respective and corresponding one of a plurality of unique indexes. FIG. 2A illustrates unique indexes for various shell sizes of D-type connectors. For example, for the far-right, middle row pin for shell size 5, the unique index for this pin may comprise 33. FIG. 2B illustrates unique indexes for various sizes of circular connectors. For example, for the far-right, bottom row pin for size 24-28, the unique index for this pin may comprise Z.

Embodiments of the disclosure may comprise a plurality of light sources respectively corresponding to first plurality of holes 112. Each one of the plurality of light sources, when initiated, may be configured to illuminate light from a bottom of its respective one of first plurality of holes 112 through a top of its respective one of first plurality of holes 112. Because first plurality of holes 112 may be configured to line up with the second plurality of holes in the first connector when the first connector is inserted in first receptacle 104, this light may illuminate out of a corresponding one of the second plurality of holes in the first connector. An operator of connector loading device 100 may see the light illuminating out of the corresponding one of the second plurality of holes in the first connector on the front side of connector loading device 100.

Each one of the plurality of light sources may comprise a Light Emitting Diode (LED) and a light pipe (e.g., an optical fiber). For example, FIG. 1B illustrates a first LED 116, a second LED 118, a third LED 120, a fourth LED 122, a fifth LED 124, and a sixth LED 126. A first light pipe 128 may correspond to first LED 116, a second light pipe 130 may correspond to second LED 118, a third light pipe 132 may correspond to third LED 120, a fourth light pipe 134 may correspond to fourth LED 122, a fifth light pipe 136 may correspond to fifth LED 124, and a sixth light pipe 138 may correspond to sixth LED 126. When any of the LEDs are activated, light from the activated LED may travel through the corresponding light pipe to a corresponding one of first plurality of holes 112. In the example of first receptacle 104 being configured for a shell size 5 (e.g., 50 pin) D-type connector, connector loading device 100 may comprise 50 LEDs with 50 respectfully corresponding light pipes. For simplicity, only 6 LEDs/light pipes are illustrated in FIG. 1B.

Furthermore, an additional light pipe may be attached to each of the LEDs. For simplicity, these additional light pipes are omitted from FIG. 1B. Each of these additional light pipes may correspond to each of third plurality of holes 114. The indexes of first receptacle 104 and second receptacle 106 may correspond. In other words, in the example of FIG. 1B, when a hole is illuminated on first receptacle 104, a corresponding hole on second receptacle 106 may be illuminated. For example, if a hole corresponding to index 33 on first receptacle 104 is illuminated, a hole corresponding to index 33 on second receptacle 106 may also be illuminated.

Connector loading device 100 may further comprise a controller 140. Controller 140 may be configured to receive an input indicating an index corresponding to one of the first plurality of holes and initiate a one of the plurality of light sources corresponding to the received index. For example, an operator of connector loading device 100 may enter 33 on keypad 110 as the input. Controller 140 may receive this input comprising 33 and cause the LED corresponding to the hole corresponding to index 33 on first receptacle 104 to be illuminated. In the example above where each LED has two light pipes, the hole corresponding to index 33 on second receptacle 106 may also be illuminated.

Controller 140 may be practiced in hardware and/or in software (including firmware, resident software, micro-code, etc.) or in any other circuits or systems. Controller 140 may be practiced in electrical circuits comprising discrete electronic elements, packaged or integrated electronic chips containing logic gates, a circuit utilizing a microprocessor, or on a single chip containing electronic elements or microprocessors. Furthermore, controller 140 may also be practiced using other technologies capable of performing logical operations such as, for example, AND, OR, and NOT, including but not limited to, mechanical, optical, fluidic, and quantum technologies. As described in greater detail below with respect to FIG. 4, controller 140 may be practiced in a computing device 400.

Figure 3:
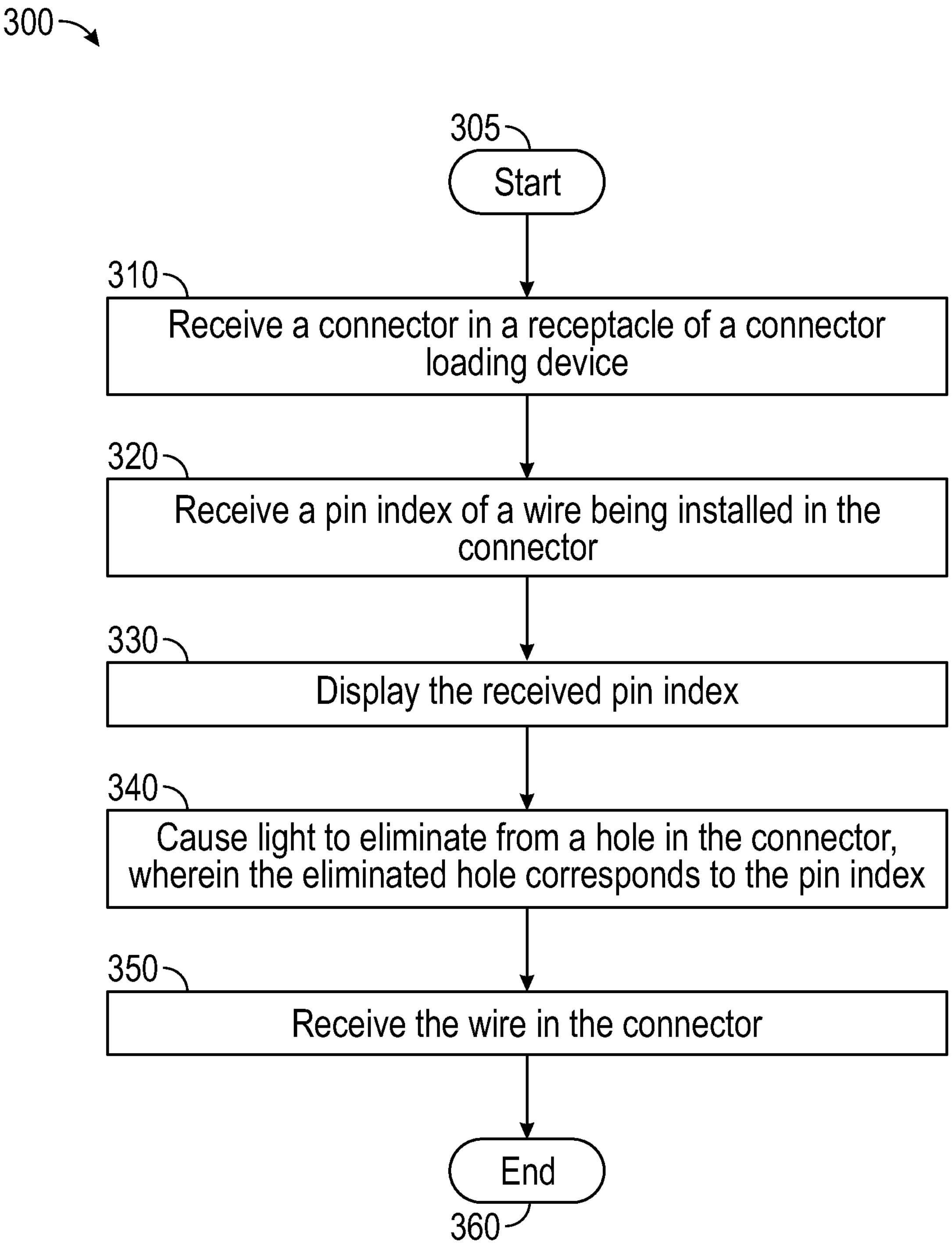
FIG. 3 is a flow chart of a method for providing connector loading.

FIG. 3 is a flow chart setting forth the general stages involved in a method 300 consistent with embodiments of the disclosure for providing connector loading. Method 300 may be implemented using a connector loading device 100 as described in more detail above with respect to FIGS. 1A and 1B. Ways to implement the stages of method 300 will be described in greater detail below.

Method 300 may begin at starting block 305 and proceed to stage 310 where connector loading device 100 may receive a connector in a receptacle of connector loading device 100. For example, an operator may place a connector in the receptacle. In the example of FIGS. 1A and 1B, the operator may place a shell size 5 (e.g., 50 pin) male D-type connector in first receptacle 104 or a shell size 5 (e.g., 50 pin) female D-type connector in second receptacle 106.

From stage 310, where connector loading device 100 receives the connector in the receptacle, method 300 may advance to stage 320 where connector loading device 100 may receive a pin index of a wire being installed in the connector. For example, the operator may be in the process of loading a plurality of wires in the connector. Each of the plurality of wires may have a pin index etched in the insulation of the wire. The operator may read the pin index from one of the plurality of wires and then enter this pin index in keypad 110.

Once connector loading device 100 receives the pin index of the wire being installed in the connector in stage 320, method 300 may continue to stage 330 where connector loading device 100 may display the received pin index. For example, as a confirmation that the correct pin index was entered into keypad 110, connector loading device 100 may display the pin index that was entered into keypad 110 on display 108. In this way, the operator may confirm that the correct pin index was entered by comparing the pin index etched in the insulation of the wire to the index displayed on display 108.

After connector loading device 100 displays the received pin index in stage 330, method 300 may proceed to stage 340 where connector loading device 100 may cause light to eliminate from a hole in the connector, wherein the eliminated hole corresponds to the pin index. In the example of FIGS. 1A and 1B, the operator of connector loading device 100 may have enter 33 on keypad 110 as the input. Controller 140 may receive this input comprising 33 and cause the LED corresponding to the hole corresponding to index 33 on first receptacle 104 to be illuminated.

From stage 340, where connector loading device 100 causes light to eliminate from the hole in the connector, method 300 may advance to stage 350 where connector loading device 100 may receive the wire in the connector. For example, having read 33 from the wires insulation and entering this in keypad 110, the operator may see the hole corresponding to 33 illuminate. The operator may then push the wire into the illuminated hole until that the operator hears a click. This click may indicate that the wire is now connected to the connector. Once connector loading device 100 receives the wire in the connector in stage 350, method 300 may then end at stage 360.

Figure 4:
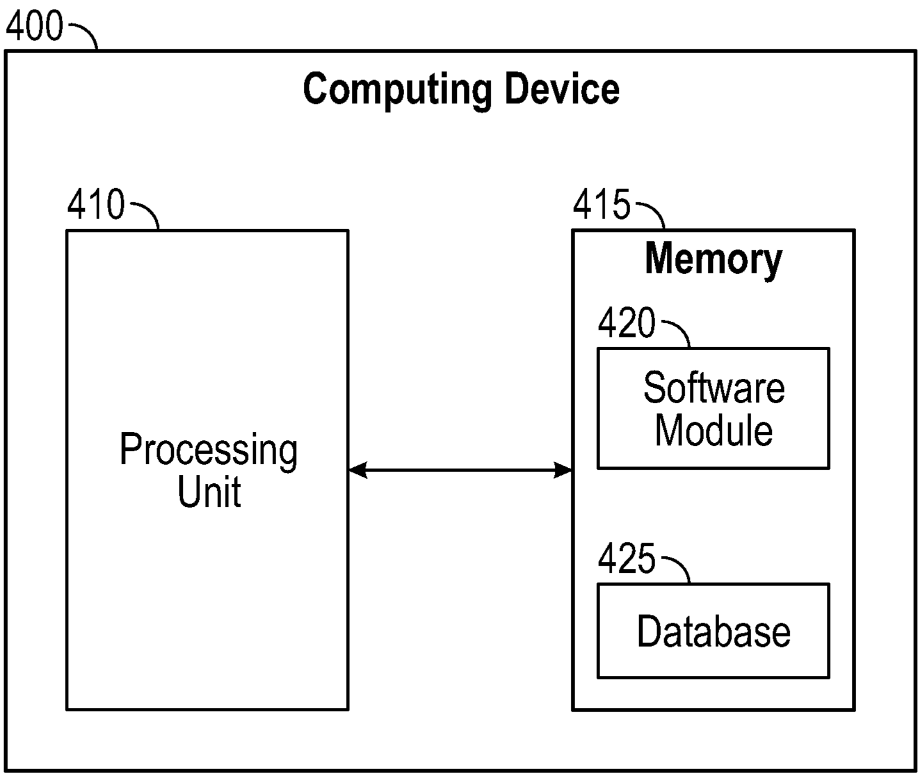
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform some of the stages, for example, for providing connector loading as described above with respect to FIG. 3. Computing device 400, for example, may be deployed in connector loading device 100. Notwithstanding, computing device 400 may be deployed anywhere and data may be transmitted to and from connector loading device 100 to a network, for example, and then communicated to computing device 400.

Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIGS. 1A and 1B may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:

a receptacle comprising a first plurality of holes wherein the first plurality of holes are configured to respectively line up with a second plurality of holes in a connector when the connector is inserted in the receptacle wherein each one of the first plurality of holes comprises a respective and corresponding one of a plurality of unique indexes;

a plurality of light sources respectively corresponding to the first plurality of holes wherein each one of the plurality of light sources, when initiated, is configured to illuminate light from a bottom of its respective one of the first plurality of holes through a top of its respective one of the first plurality of holes; and a controller configured to:

receive an input indicating an index corresponding to one of the first plurality of holes, and initiate a one of the plurality of light sources corresponding to the index.

2. The system of claim 1, wherein the receptacle comprises a male receptacle and the connector comprises a male connector.

3. The system of claim 1, wherein the receptacle comprises a female receptacle and the connector comprises a female connector.

4. The system of claim 1, wherein the connector comprises a D-type connector.

5. The system of claim 1, wherein the connector comprises a circular connector.

6. The system of claim 1, further comprising a display configured to display the index.

7. The system of claim 1, further comprising an input device configured to:

receive the input corresponding to the index corresponding to the one of the first plurality of holes; and forward the input to the controller.

8. The system of claim 7, wherein the input device comprises a keypad.

9. A method comprising:

receiving a connector in a receptacle of a connector loading device, the receptacle comprising a first plurality of holes that are configured to respectively line up with a second plurality of holes in the connector when the connector is inserted in the receptacle wherein each one of the first plurality of holes has a corresponding index and has a corresponding light source configured to cause light to illuminate from the hole;

receiving an index of a wire being installed in the connector; and causing light to illuminate from a hole of the first plurality of holes in the receptacle, wherein the illuminated hole corresponds to the index of the wire being installed in the connector.

10. The method of claim 9, further comprising displaying the received index on a display located in the receptacle.

11. The method of claim 9, further comprising receiving the wire in the connector in the illuminated hole.

12. The method of claim 9, wherein the receptacle comprises a male receptacle.

13. The method of claim 9, wherein the receptacle comprises a female receptacle.

14. The method of claim 9, wherein the connector comprises a D-type connector.

15. The method of claim 9, wherein the connector comprises a circular connector.

16. The method of claim 9, wherein receiving the index comprises receiving the index at a keypad on the connector loading device.

17. A system comprising:

a first receptacle comprising a first plurality of holes wherein the first plurality of holes are configured to line up with a second plurality of holes in a first connector when the first connector is inserted in the first receptacle wherein each one of the first plurality of holes comprises a respective and corresponding one of a plurality of unique indexes;

a second receptacle comprising a third plurality of holes wherein the third plurality of holes are configured to line up with a fourth plurality of holes in a second connector when the second connector is inserted in the second receptacle wherein each one of the third plurality of holes comprises a respective and corresponding one of the plurality of unique indexes;

a plurality of light sources respectively corresponding to the first plurality of holes and the third plurality of holes wherein each one of the plurality of light sources, when initiated, is configured to illuminate light from a bottom of its respective one of the first plurality of holes through a top of its respective one of the first plurality of holes and is configured to illuminate light from a bottom of its respective one of the third plurality of holes through a top of its respective one of the third plurality of holes; and a controller configured to:

receive an input indicating an index corresponding to one of the first plurality of holes or one of the third plurality of holes, and initiate a one of the plurality of light sources corresponding to the index.

18. The system of claim 17, wherein the first connector and the second connector are of a same type and size and the first connector comprises a female connector the second connector comprises a male connector.

19. The system of claim 17, wherein the first connector and the second connector comprise D-type connectors.

20. The system of claim 17, wherein the first connector and the second connector comprise circular connector.

* * * * *